United States Patent Office 3,368,081
Patented Feb. 6, 1968

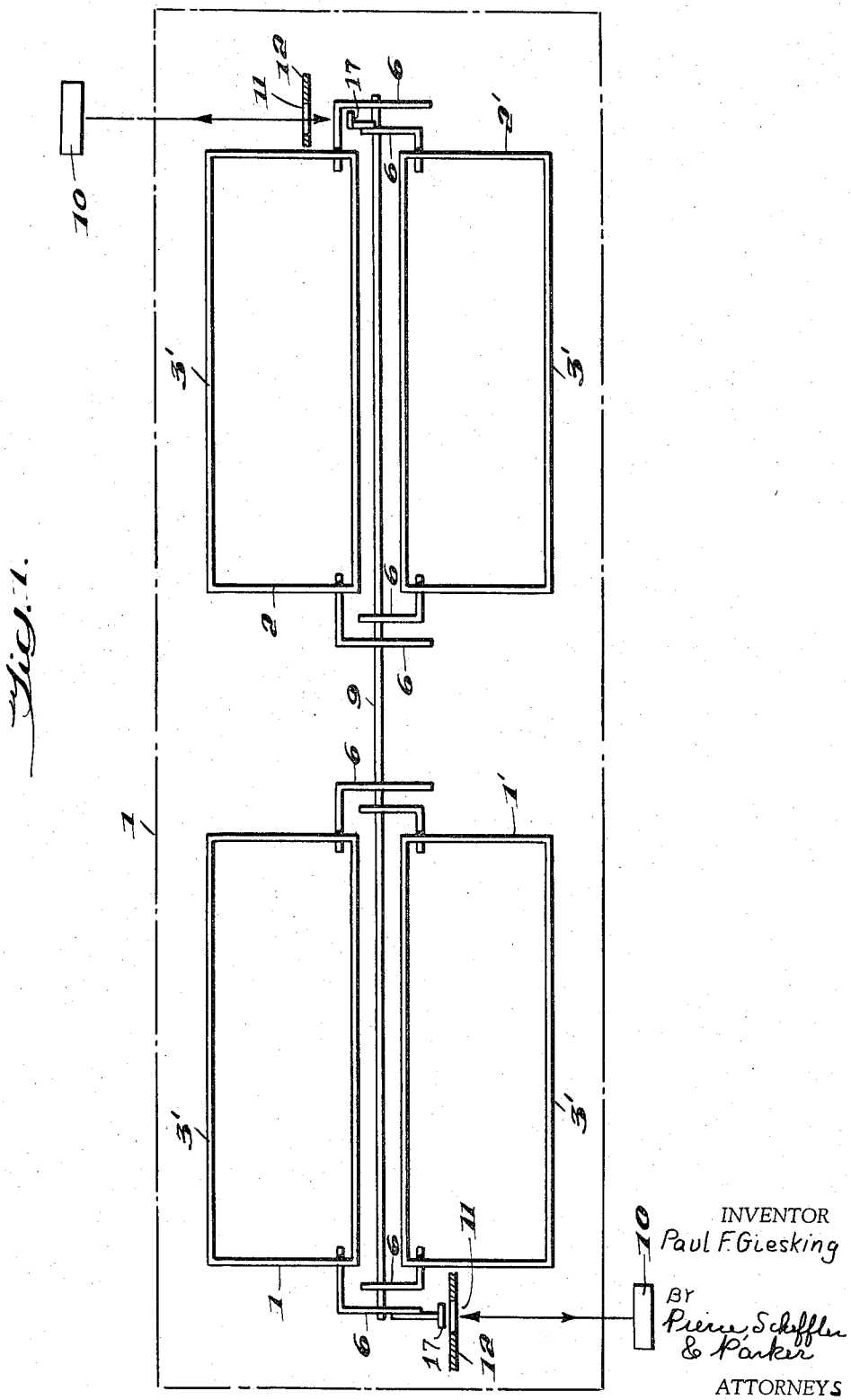

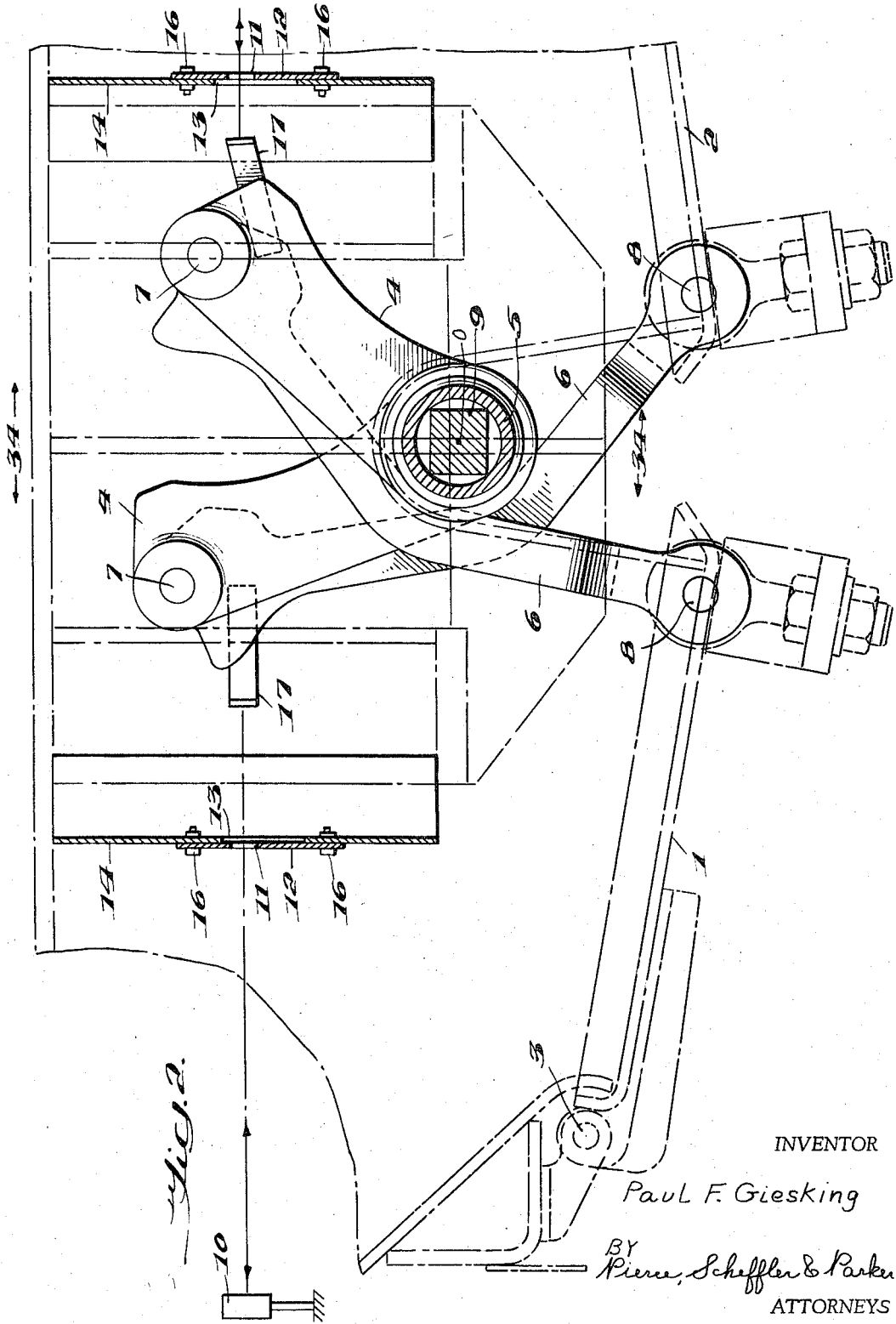

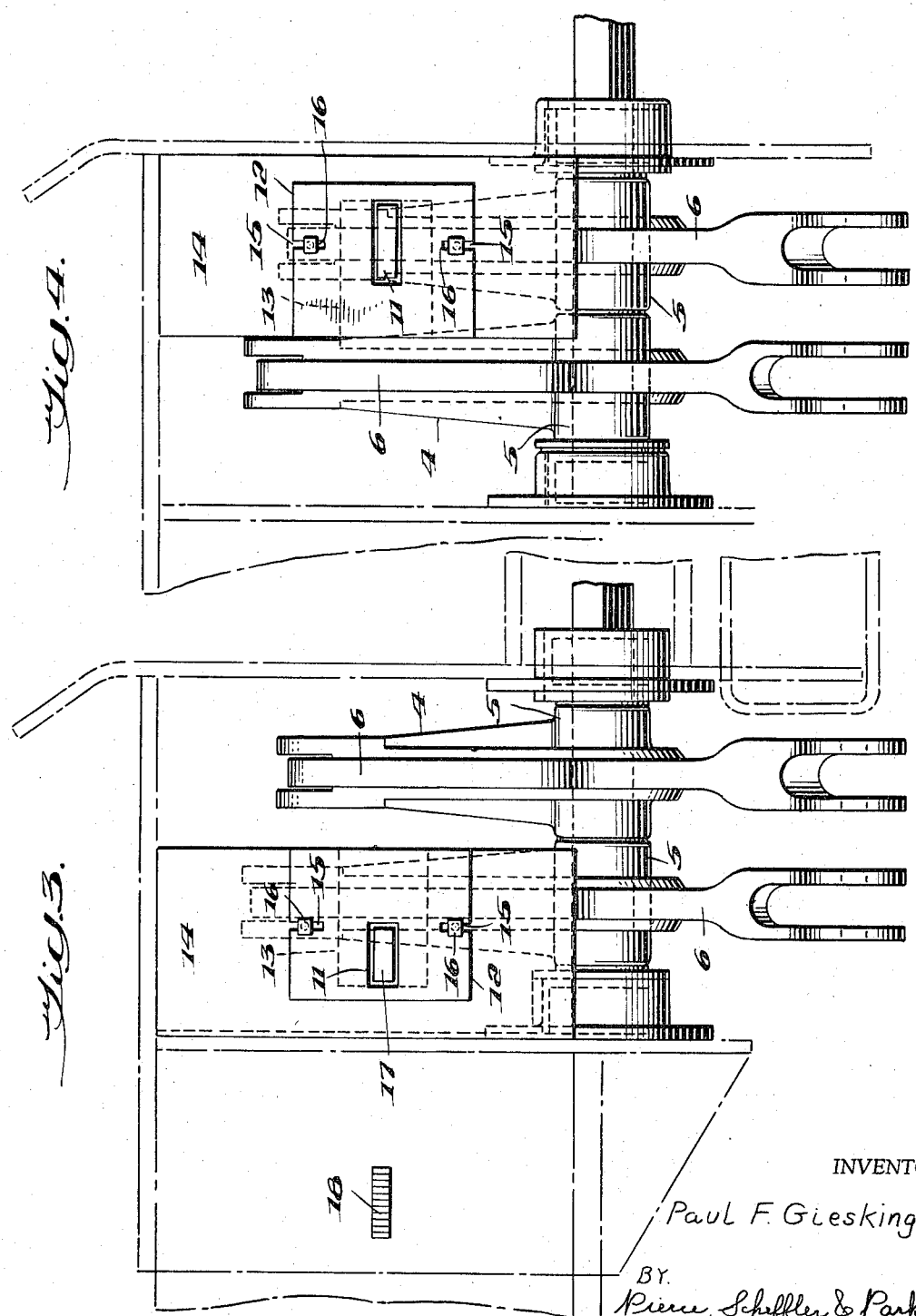

3,368,081
AUTOMATIC TRACKSIDE CAR DOOR POSITION RECORDER
Paul F. Giesking, Sept Iles, Quebec, Canada, assignor to Pickands Mather & Co., Cleveland, Ohio, a corporation of Delaware
Filed Apr. 30, 1965, Ser. No. 452,126
Claims priority, application Canada, Feb. 12, 1965, 923,187
3 Claims. (Cl. 250—230)

The present invention relates to an improvement in vehicles for the transport of particulate solid materials, such vehicles being of the bottom-dumping type, representative of which vehicles are freight cars of the gondola type which are loaded at the top and emptied through dump doors at the bottom.

A primary object of the invention is to provide an improved arrangement for detecting and reporting on the position of the dump doors as the vehicles pass a wayside detection point.

The invention is particularly useful with gondola cars designed to haul comparatively small sized solid fluent materials such as ore concentrates, pelletized ore and the like where it is most essential that the dump doors be in their fully closed position in order to prevent leakage of the contents during transport.

In accordance with the invention, should one or more dump doors on a particular car in a train being made up not be fully closed when the car passes a detection point, this fact will be transmitted to a receiving station along with other information pertaining to the car such as its number and thus enable the supervisor to have a track crew check that particular car. The doors may have been left open or they may have failed to close completely.

More particularly, the condition of the dump doors is reported in accordance with the invention by means of an optical scanner which is placed along the side of the track, the beam produced by this scanner having a direction normal to the track and being trained upon an aperture located in a side plate of the car and which is associated with a target mounted upon the movable operating mechanism for the dump doors, the arrangement being such that the target will come into alignment with, and be visible to the scanner through, the aperture, only when the doors are fully closed. By properly coding the target according to the same general system utilized by the scanning system to telemeter other information about the car to an information receiving and recording center, the condition of the dump doors on the various cars can be reported.

In accordance with another object of the invention, a dump door reporting arrangement comprising a target and related aperture is located at each end of the car, and on opposite sides thereof, to enable the condition of the dump doors to always be reported to the track-side scanning mechanism even though the latter is located at only one side of the track.

The foregoing as well as other objects and advantages inherent in the invention will become more apparent from the following detailed description of a preferred embodiment thereof and from the accompanying drawings wherein:

FIG. 1 is an outline view in plan of the car showing the general lay-out of the bottom dump doors in association with targets carried by the door operating mechanism at opposite ends of the car, each target being correlated to a viewing aperture in a side plate of the car, and the viewing apertures being located on opposite sides of the car;

FIG. 2 is a detailed view of the operating mechanism at each end of each door;

FIG. 3 is a detailed view of the door operating mechanism at the left end of the car as depicted in FIG. 1, this view corresponding to that part of FIG. 2 to the left of line 3—3; and FIG. 4 is a view similar to FIG. 3 but showing the detail of the door operating mechanism at the right end of the car as depicted in FIG. 1, this view corresponding to that part of FIG. 2 to the right of line 4—4.

With reference now to the drawings, the generally rectangular outline of the car is indicated at 1. None of the details of the car structure such as its wheel tracks and main body have been included since these are not essential to an understanding of the invention. The car is provided with two sets of double dump doors 1, 1' and 2, 2' located at the bottom portion of the car body and each set of doors serves to discharge essentially one half of the total loading of the car. Each door is hung along one side from the bottom part of the car on a hinge structure 3 as shown in FIG. 2. The hinge line extends longitudinally of the car and is indicated by line 3' in FIG. 1. Connected to the other side of each door at each end thereof is an over-center lever mechanism comprised of a rocker arm 4 projecting from a rocker sleeve 5 and a lever 6 which is seen to have a dog-leg shape. One end of each lever 6 is articulated at 7 to the outer end of the rocker arm 4, and the opposite end of this lever is connected by an articulated joint 8 to the dump door.

A square shaft 9 extends through all of the rocker sleeves 5 and hence, as depicted in FIG. 1 extends essentially from one end of the car to the other. Each rocker sleeve 5 is secured fast upon shaft 9 and the latter is arranged for rotation about its axis so as to actuate both sets of double dump doors simultaneously to their open and closed positions.

When the dump doors 1, 2 are fully closed, rocker arms 4 and levers 6 will be in the positions indicated in FIG. 2. A line connecting the centers of the articulating joints 7, 8 will thus pass through sleeve 5 and shaft 9 to one side of the rotational axis O and thus establish the necessary over-center relationship to hold the dump doors in their closed position. To open the doors, rocker arms 4 are forcibly rotated until the connecting line between the articulation centers 7, 8 passes through the axis O whereupon gravitational forces can, if desired, be permitted to take over and cause the doors to drop to their full open position.

In accordance with the invention, the gondola car is provided with means by which one is able to automatically check the position of the dump doors as they pass a checking station and establish a record for each car which can then be examined to determine whether or not the doors of each car are fully closed. As previously explained, the door checking mechanism is comprised of a target in association with a viewing aperture at each end of the car, each target being supported on one of the levers of the over-center door actuating mechanism at that end of the car and so positioned thereon that it will be visible through the viewing aperture only when the doors are in their fully closed position. The sets of targets and viewing apertures are located on opposite sides of the car so that one set will always be located in a position to be viewed by an optical scanning mechanism 10 located at a selected side of the trackway, the beam produced by this scanning mechanism having a direction normal to the track, as depicted in FIGS. 1 and 2.

The viewing aperture established at each end of the car but on opposite sides thereof is constituted by a rectangular opening 11 in a plate 12 which is secured over an elongated slot 13 of much greater area than opening 11, the slot 13 being provided in a vertical side plate 14 of a sub-sill of the car. Plate 12 includes vertically extending aligned slots 15 which receive fastening bolts 16. This slot-and-bolt arrangement permits plate 12 to be accurately adjusted to the position wherein the viewing aperture 11 will be in exactly horizontal alignment with the face of target 17 secured to lever 6 only when the doors are in their fully closed position. Thus, only when the dump doors are fully closed will the beam from the optical scanning mechanism 10 strike and be reflected from the face of the target.

The optical scanning mechanism can take various forms, and one suitable arrangement is disclosed in United States Patent No. 3,145,291 issued Aug. 18, 1964, to H. B. Brainerd. This patent is directed to a car identification system using an optical scanning mechanism similar to that schematically depicted at 10 in the present application. The track-side located optical scanner operates in association with a set of binary coded retro-reflective markings on the side of the car indicative of the car number. As the car passes by the scanning mechanism, the car number is "read" and recorded on cards or tape or any other suitable recording medium. This set of coded retro-reflective markings is indicated generally in FIG. 3 of the present application by the coded area 18 placed on sub-sill at the same level as the viewing aperture 11. Assuming the dump doors to be fully closed, after the optical scanner has read the identification number of the car from the coded area 18, it will then read and record the fact that the doors are fully closed from a similar color coding applied to the face of target 17. If the dump doors are not fully closed, target 17 will not be visible to the scanning mechanism as the car passes by and hence, this fact will be revealed on the record which is made. After an entire train of cars has been passed through the optical scanning mechanism, the record which is made can then be reviewed to determine whether there are any cars in the train whose doors are not fully closed. Such cars can then be checked individually.

I claim:

1. In a system for recording data relative to the position of dump doors on gondola cars wherein said car doors are pivotally mounted and wherein means are provided for actuating the doors between their open and closed positions, the combination comprising a trackside located optical scanning and recording device producing a scanning beam having a direction normal to the track, means establishing a viewing aperture at the side of said car for passing said scanning beam therethrough, and a target located on the side of said aperture away from said scanning and recording device for reflecting said scanning beam to said recording device, said target being moved by said door actuating means into a position in alignment with said aperture and reflecting said scanning beam when said doors are closed and into another position out of alignment with said aperture when said doors are open.

2. A system as defined in claim 1 for recording data relative to the position of dump doors on gondola cars wherein said car includes means establishing a viewing aperture at each side thereof and a movable target correlated to each said aperture and which is movable by said door actuating means.

3. A system as defined in claim 1 for recording data relative to the position of dump doors on gondola cars wherein said doors are actuated between their open and closed positions by means including an over-center mechanism and wherein said target is located on said over-center mechanism.

References Cited

UNITED STATES PATENTS

| | | | |
|---|---|---|---|
| 2,906,885 | 9/1959 | Orthuber et al. | 246—169 X |
| 3,248,538 | 4/1966 | McCauley et al. | 246—169 |
| 3,262,401 | 7/1966 | Gibson | 105—304 X |
| 2,581,552 | 1/1952 | O'Hagan | 246—2 |
| 3,145,291 | 8/1964 | Brainerd | 235—61.11 |
| 3,234,892 | 2/1966 | Lunde | 105—240 |

ARTHUR L. LA POINT, *Primary Examiner.*

S. B. GREEN, H. BELTRAN, *Assistant Examiners.*